United States Patent [19]
Cavanaugh

[11] Patent Number: 6,078,714
[45] Date of Patent: Jun. 20, 2000

[54] FIBER OPTIC BUNDLE INTERFACE COOLING SYSTEM

[75] Inventor: David Barr Cavanaugh, Scottsdale, Ariz.

[73] Assignee: The Boeing Company, St. Louis, Mo.

[21] Appl. No.: 09/126,351

[22] Filed: Jul. 30, 1998

[51] Int. Cl.[7] .................................................. G02B 6/04
[52] U.S. Cl. ........................................ 385/115; 385/136
[58] Field of Search .................................. 385/115, 117, 385/120, 121, 134, 136, 137

[56] References Cited

U.S. PATENT DOCUMENTS

| | | | |
|---|---|---|---|
| 3,611,179 | 10/1971 | Fyler | 372/6 |
| 4,363,080 | 12/1982 | Sylvester | 362/32 |
| 5,202,893 | 4/1993 | Kubota et al. | 372/34 |
| 5,243,617 | 9/1993 | Pocholle et al. | 372/69 |
| 5,315,683 | 5/1994 | Miller | 385/136 |

*Primary Examiner*—Cassandra Spyrou
*Assistant Examiner*—Euncha Cherry
*Attorney, Agent, or Firm*—Lawrence G. Kurland, Esq.; Bryan Cave LLP

[57] ABSTRACT

A fiber optic bundle interface cooling system and apparatus is provided. Optical fibers are in part enclosed in a chamber, with the bundle interface facing a windowed wall. A separation plate with apertures is spaced apart from the bundle interface, and the optical fibers extend through the apertures. Fluid enters the chamber and passes through the interstitial channels of the bundle interface to remove heat, and exits the chamber. The apparatus for cooling a FO bundle interface has a chamber with a separation plate, a windowed wall, and a fiber optic clamp for holding the bundle interface in place. A pump is operatively connected to the chamber for moving fluid.

49 Claims, 2 Drawing Sheets

FIBER OPTIC BUNDLE INTERFACE COOLING SYSTEM

FIELD OF THE INVENTION

The present invention relates to the use of fiber optics for channeling high intensity light over long distances. The present invention also relates to an apparatus and method for cooling a fiber optic bundle interface so the bundle interface can withstand high intensity light and experience minimal excess heating.

BACKGROUND OF THE INVENTION

Fiber optics can be used for channeling high intensity light over long distances with high efficiency. This is possible due to the high purity and low absorptivity of current fiber optic (FO) materials. The difficulty with transporting high intensity light with FO devices, however, is that the transfer of high intensity light into a bundle of fibers generates a severe heat load that damages the fibers at the interface of the bundle. Intense illumination from a light source often causes the ends of the fibers at the interface to burn, thereby destroying the fibers prematurely.

The heating which results from the transfer of light from a high intensity light source to a FO bundle interface is generally caused by "stray" light rays. Light rays stray from the FO bundle and generate heat in either of two instances. First, if the Numerical Aperture (NA) of the light source is larger than the NA of the fiber optic, then the light rays from the source have a high angle of incidence to their point of contact within the fibers. Rather than being captured by the fibers, these rays are transmitted through the cladding of the fiber into the interstitial spaces between the fibers. These rays are then scattered by multiple reflections, and are eventually converted to heat. The second instance in which light rays stray from the FO bundle relates to the fact that about 10% of the surface area of the face of a hexagonal close packed fiber bundle consists of interstitial voids between the fibers. Light rays which enter these areas directly are not captured by the fiber optics, and are also dissipated as heat.

A promising application for FO technology is the collection of sunlight and the distribution of light therefrom. Fresnel lenses or other known optical devices can be used to concentrate sunlight from a large collection area onto a smaller FO bundle interface. The energy density at the interface can be extremely high. Fresnel lenses generally have a poorly defined NA, though, and some of the focused energy thus escapes the fibers near the interface and generates heat. Even with well designed optics, roughly 10% of the focused energy will always be converted to heat since it directly enters the interstitial spaces present on the FO bundle face.

Glass and quartz fiber has until recently been used for most FO applications. Glass or quartz fibers are very heat resistant. They also have a high heat conductivity. However, the interstitial voids between closely packed fibers act as thermal insulation, preventing the conduction of heat from the interior fibers of the bundle outward. Epoxy has been used to fill the interstitial spaces. However, the temperature of the light which can be focused on the bundle is limited by the temperature sensitivity of the epoxy.

Plastic fiber optic is available which is flexible, rugged and light weight. It also has low optical attenuation. Plastic fiber optic can be obtained at a much lower cost than glass or quartz fiber. Plastic fiber is ideal for many light pipe applications. However, its low softening and melting temperatures (~80° C.) make it especially susceptible to damage from excessive heat. Plastics generally have a low heat conductivity. Thus, a bundle of plastic fibers tends to insulate and accumulate heat.

Both plastic and glass FO bundles will be destroyed rapidly when exposed to concentrated sunlight or other focused high intensity light sources, unless some method of cooling the FO bundle interface is used.

U.S. Pat. No. 4,363,080 to Sylvester discloses an apparatus for supplying a source of light by fiber optic for dental applications. A quartz-halogen light is placed in a brass heat sink which contains conduits for the flow of coolant throughout as a means of cooling the lamp. The fiber optic bundle interface is also present in the heat sink and likely benefits from the presence of the cooling conduits. This design utilizes a heat transfer scheme that acts only on the external surfaces of the fiber bundle. Such a heat transfer scheme relies on the bulk thermal conductivity of the bundle material to transfer the internal heat to an outer surface where it can be removed. The poor heat transfer characteristics of FO material severely limit the size and utility of these designs.

A growth market for fiber optic technology is in distribution of lighting within homes and office buildings using fiber optic light pipes. A single solar collector or high intensity source is much more economical and efficient to operate and maintain than a distributed set of smaller collectors or sources. The most expensive component of such a system is the light source. The use of larger or more intense light sources is limited by the lack of an efficient method of cooling the light collection interface.

A known method for cooling the interface of a fiber optic bundle receiving light from a solar collector involves the use of a short length of rod made of quartz or glass fibers which are fused together. The fused fibers of the rod function as light guides between the collection optic which serves as a light source and the fiber light pipes which distribute the light. The rod is jacketed in a finned cylindrical heat sink, with the two ends of the rod exposed. Light from the collection optic is focused on one end of the rod. The other end is placed against the bundle of plastic or glass light pipes. The fused rod collects the focused light with high efficiency since there are no interstitial voids. Rays of light which are outside the NA of the fibers in the rod escape the fiber cladding and are scattered in the rod and dissipated as heat. This heat is conducted along the rod. The sink absorbs the heat before it reaches the joint to the distribution fibers. The light exiting the rod does not contain light rays outside the NA of the light pipes, thereby minimizing the heat produced as the light crosses the butt joint into the distribution fibers.

This method is limited by several factors. The thermal conductivity of the rod is low enough to qualify it as a thermal insulator. The rod diameter thus cannot be made so thick that conduction into the heat sink is slower than the heat production in the rod. Rods with a maximum thickness of ⅜ inch have been reported. In addition, the optical transfer between the rod and distribution bundle is inefficient since fiber to fiber joints are not possible between the fused rod and the unfused distribution fibers.

U.S. Pat. No. 3,611,179 to Flyer discloses a laser device which produces coherent light. Energy generated from the heated cathode is reflected into the core of the cylindrical laser device. To cool the core which consists of a bundle of optical fibers as well as to cool the anode, cooling fluid flows through the space between the fiber bundle and the anode.

This space is parallel to the axis of the fiber bundle. Spacing rings are present between the fiber bundle and the anode. The rings are said to force coolant into the interstitial spaces of the bundle. The Flyer patent must not require close packing of the fiber bundle, since coolant is permitted to travel through interstices in the FO rod structure from this external space.

The closer the fiber rods are packed, the greater the pressure necessary for the coolant to access the interstices in this manner. If the interstices are accessed, the cooling fluid pools there and only exits by returning to the space external to the bundle.

In accordance with the utility of the laser as a light source, a coherent beam exits the end of the core. The Flyer patent does not address the problem of cooling the face of fibers which receives light to be transmitted.

U.S. Pat. No. 5,315,683 to Miller, which is incorporated by reference herein, reports a ventilated fiber optic bushing which holds a bundle of optical fibers together. In order to have a cooling gas travel through the interstitial spaces of the fiber bundle, there are numerous specific requirements of the apparatus, including the light source, for providing this cooling air. The bundle of fibers is clamped within an elastomeric tube, in order to clamp the fibers into another tube which is rigid. The rigid tube holding the fibers is inserted into a light-emitting aperture of a light projector. The window of the light-emitting aperture of the light projector, which is the same size and shape as the fiber bundle, is disposed opposite the end of the fibers. A cooling fan is disposed within the light projector to draw external air through the interstitial spaces of the fiber bundle and around the window. The ends of the fibers proximate to the window have convex ends. The convex shape assists in having the air which passes through the interstitial spaces travel across the illuminated face of the fiber bundles for cooling.

For the fan disposed in the projector to draw air through the interstitial spaces, both the light projector and the bushing must be within a sheath to prevent the movement of extraneous air. The apparatus is designed exclusively for the use of a gas coolant.

SUMMARY OF THE INVENTION

The present invention provides a fiber optic bundle interface cooling system for cooling the interface of a bundle of optical fibers which is capable of receiving light from a light source. The cooling system has a chamber which has a windowed wall. A bundle of optical fibers is at least in part enclosed within the chamber. These optical fibers have optical fiber ends that are gathered such that interstitial spaces are present between the gathered optical fiber ends to provide the fiber optic bundle interface. The bundle interface is in proximity to the window of the windowed wall so that it can receive light which passes through from the light source.

The cooling system has a separation plate which is spaced apart from the bundle interface. The separation plate has a plurality of apertures. Within each aperture one of the optical fibers of the bundle extends through. The separation plate holds each optical fiber separate from each other such that a gap is provided. Each optical fiber is sealed to the separation plate.

An inlet is present for providing cooling fluid to the chamber. An outlet is also present for removing fluid from the chamber. A pump is operatively connected to the chamber for moving cooling fluid through the interstitial spaces.

Preferably, the windowed wall is spaced from the bundle interface to provide a conduit for fluid flow between the bundle interface and the windowed wall. The pump moves fluid from the interstitial channels into the conduit, where it moves the fluid across the face of the bundle interface. Also preferably, the chamber is enclosed and the system is capable of being pressurized and of providing high flow rates of fluid through the chamber.

The present invention also provides an apparatus for cooling a fiber optic bundle interface having a chamber with an inlet, an outlet, a separation plate having a plurality of apertures, and a windowed wall opposite the separation plate. The apparatus has an optical fiber clamp for holding optical fiber ends in a gathered configuration within the chamber, where the optical fiber clamp is in proximity to the windowed wall. The apparatus also has a pump operatively connected to the inlet and the outlet. It also has a reservoir for holding a cooling fluid.

The present invention also provides a method for cooling a bundle interface. The method involves moving a fluid into a chamber having a bundle of optical fibers, a portion of which is the bundle interface, such that the fluid enters the gap defined by a separated fiber portion of the optical fibers. The next step is moving the fluid through the interstitial channels. Finally, the method involves moving the fluid out of the chamber. These steps are preferably brought about by the continuous action of a pump moving the fluid.

DETAILED DESCRIPTION OF THE INVENTION

Figure 1:
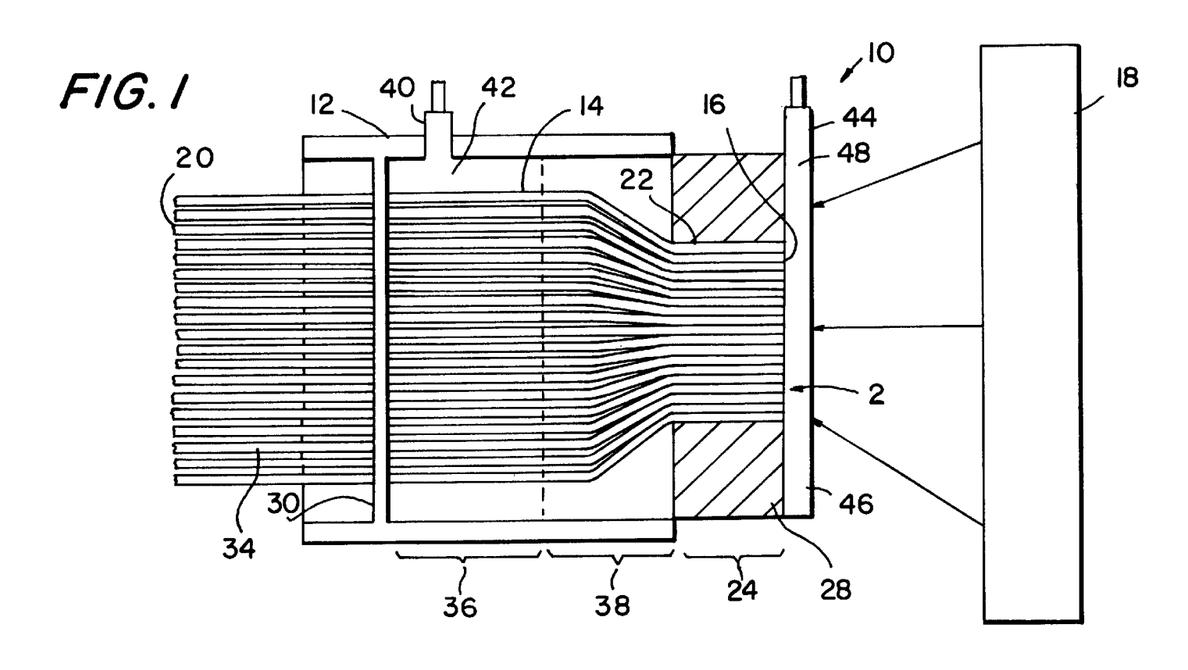
FIG. 1 diagramatically illustrates a fiber optic bundle interface cooling system in accordance with the present invention.

A fiber optic bundle interface cooling system 10 in accordance with the present invention is shown in FIG. 1. The cooling system 10 has a chamber 12 disposed to hold conventional optical fibers 14 therein. The chamber 12 is moisture-tight, capable of being pressurized and suitable for having a fluid flow through it. The chamber 12 may be composed of any suitable material such as aluminum, stainless steel, plastic or the like. When plastic is used for pressurized applications, it is preferably PVC plastic. The chamber 12 is preferably cylindrical in shape.

A bundle of optical fibers 14 preferably have their proximal ends 16 in proximity to a light source 18. The distal ends 20 of the optical fibers 14 preferably permit the light transferred from the light source 18 and channeled by the optical fibers 14 to freely exit for distribution to a remote location. The optical fibers 14 can be long to carry light over distances if desired. Preferably, only a portion of each of the optical fibers 14 is present within chamber 12.

Figure 2:
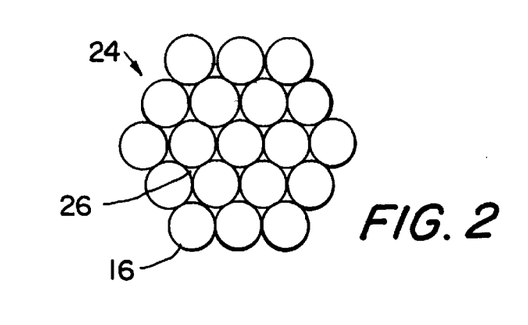
FIG. 2 is a front elevational view of a fiber optic bundle interface employed in the system of FIG. 1.

The optical fibers 14 have bundled ends 22 (including proximal ends 16) which are preferably gathered to form a bundle interface 24 which receives light from the light source 18. A view looking in the direction of arrow 2 at the face of the bundle interface 24 is illustrated in FIG. 2 (shown, by way of example, with fewer optical fibers than are illustrated in the bundle interface 24 of FIG. 1). As shown and preferred, the bundled ends 22 (which extend straight behind proximal ends 16) are closely packed together to maximize the capture of light rays. The bundle interface 24 is preferably packed tightly in a hexagonal close packed configuration as shown. A plurality of interstitial channels 26 comprise spaces between the bundled ends 22. Each interstitial channel 26 is preferably defined by the meeting of three contiguous bundled ends 22. Preferably, each channel 26 does not communicate laterally with the other adjacent channels 26 or laterally outside the bundle interface 24.

As further shown and preferred in FIG. 1, once the bundled ends 22 are gathered, they are then loaded into an optical fiber clamp 28 which fixedly holds the bundled ends 22 in their tightly packed configuration. The optical fiber clamp 28 is in proximity to windowed wall 46. Preferably, as shown, the fiber clamp 28 is spaced apart from the windowed wall 46. The fiber clamp 28 can alternatively be flush with the windowed wall 46. The bundle interface 24 and a portion of the optical fibers 14 adjacent the bundled ends 22 are preferably disposed within the chamber 12.

Figure 3:
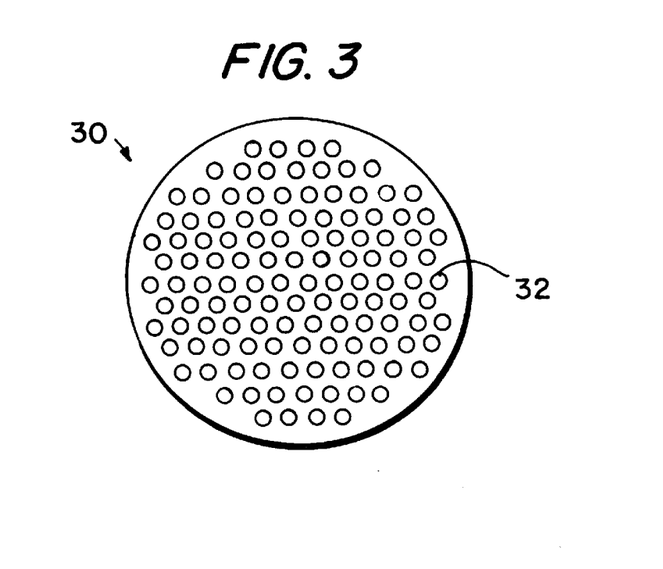
FIG. 3 is a front elevational view of a fiber optic separation plate employed in the system of FIG. 1.

A separation plate 30 is preferably spaced apart from the bundled ends 22 and is attached and sealed to the chamber 12 at a point distal to the light source 18. A front view in the direction of arrow 2 of the separation plate 30 is shown in FIG. 3. The separation plate 30 preferably contains a plurality of apertures 32. The diameter of each aperture 32 is preferably drilled to accommodate the diameter of an optical fiber 14. One optical fiber 14 is preferably present in chamber 12 for each aperture 32 of the separation plate 30. Preferably, the apertures 32 are evenly spaced apart from each other in an array, for example, as shown in a staggered placement. The distance between the apertures of the separation plate 30 can be any distance desired, although it must be of a length such that sufficient strength of the separation plate is maintained, particularly for pressurized applications. The optical fibers 14 which extend from the bundled ends 22 are preferably placed through the separation plate 30. The separation plate 30 preferably maintains a gap 34 between all optical fibers 14 in the vicinity of the separation plate 30 so that there is no contact between optical fibers 14. The portion of the optical fibers 14 within the chamber 12 that are held separate by the separation plate 30 is referred to as a separated fiber portion 36.

Adjacent to the separated fiber portion 36 is a fiber transition portion 38. Most of the optical fibers 14 of the fiber transition portion 38 preferably bend to accommodate their placement in the gathered configuration of the fixedly held bundle ends 22 as well as their separated disposition in the separated fiber portion 36. As shown and preferred in FIG. 1, the vertical spacing of the apertures 32 of the separation plate 30 results in the optical fibers 14 spreading out vertically starting at the separated fiber portion 36. Although not apparent in FIG. 1, it can be seen by the spacing of the apertures 32 in FIG. 3 that the optical fibers 14 are preferably also spread horizontally apart. This spreading also preferably begins at the separated fiber portion 36.

The optical fibers 14 are preferably unjacketed and are preferably of uniform diameter. For the flexibility and ease of transitioning desirable in the transition portion 38, the optical fibers 14 are preferably plastic.

It is also possible to use glass or quartz optical fibers. The glass can be specially sintered to prepare the optical fibers 14 with a transition portion 38. The optical fibers 14 closer to the outside of the bundle require a greater angle of transition in the transition portion 38. Each glass optical fiber 14 has a respective angle of transition such that the bundle preferably achieves a fixed configuration of the fiber transition portion 38.

The optical fibers 14 used can be of any diameter. For example, 1.0 mm or 1.5 mm optical fibers 14 may be used. A separation plate 30 with different sized apertures 32 is used depending on the diameter of the optical fibers 14.

When the optical fibers 14 are in place within the apertures 32, a sealant is applied to the outer side of the separation plate 30 to seal the optical fibers 14 to the separation plate 30, thus preventing fluid leakage outside the plate 30. The sealant used must be impervious to the cooling fluid. The sealant must have good bonding properties to the outer surfaces of the optical fibers 14. Since in general fiber optic jacketing material such as teflon does not bond well with the use of a sealant, it is preferable that the optical fibers 14 be unjacketed. For plastic optical fibers 14 such as polyethylene coated fibers, a strong bonding adhesive should be used as the sealant. An example of a sealant which is suitable for use with plastic optical fibers 14 is EPOX-E-KLAD® sealant (Century Plastics). EPOX-E-KLAD® sealant is a resilient adhesive epoxy which advantageously molds to the items sealed. The sealant preferably makes a high pressure seal between the optical fibers 14 and the separation plate 30. The separation plate 30 having the optical fibers 14 sealed thereto thus preferably constitutes a wall enclosing chamber 12 opposite the windowed wall 46.

An inlet 40 is a port defining an opening which allows cooling fluid to flow into the chamber 12. The inlet 40 is preferably advantageously capable of permitting pressurized cooling fluid in. When fluid enters the chamber 12 from the inlet 40, it fills area 42 between the optical fibers 14 and the chamber 12. It also fills the gap 34 between the optical fibers 14 of the separated fiber portion 36, which is readily accessible to fluid in area 42. An outlet 44 is a port from the chamber 12 defining an opening which allows circulated fluid to exit the chamber 12. Preferably, it is also advantageously capable of permitting pressurized fluid through.

The proximal ends 16 at the outer face of the bundle interface 24 are preferably cut and polished to form a flat, optical quality surface. The proximal ends 16 are preferably flush with the proximal end of the fiber clamp 28 in its preferred location spaced apart from the windowed wall 46. The windowed wall 46 of the chamber 12 is preferably spaced apart from the bundle interface 24 to provide a conduit 48 for fluid flow therebetween. The outlet 44 is preferably located in-line with the flow of fluid through the conduit 48, as shown. The window of the windowed wall 46 preferably permits light from the source 18 to pass through and contact the bundle interface 24.

The optical fiber clamp 28 is preferably solid as shown. As the preferred optical fiber clamp 28 is impervious to fluid flow, fluid flowing into the inlet 40 and the gap 34 must travel through the interstitial channels 26 of the bundled ends 22 toward the outlet 44. Heat generated in the interior of the bundled ends 22 from the transfer of light from the source 18, is exchanged directly to the fluid passing through the interstitial channels 26 and carried to a heat removal unit. The system 10 of the present invention forces a cooling fluid to flow through the interstitial channels 26 between the closely packed bundled ends 22 for the efficient transfer of heat from the interior of the bundle interface 24.

The optical fiber clamp 28 is made of a sturdy material which holds the bundled ends 22 In place. Preferably, it is made of brass, metal or other material which will also remove heat from the bundled ends 22 in a direction external to the bundled ends 22, particularly closer to the fiber transition portion 38 as the cooling fluid is in area 42.

The optical fiber clamp 28 can alternatively have at least one passageway for fluid flow therethrough (not shown). Such a passageway preferably permits fluid to flow from the area 42 through the fiber clamp 28 to the conduit 48. The size and number of passageways can vary, depending on the relative fluid flow desired through the interstitial channels 26 to absorb heat from the interior of the bundled ends 22, as compared to that desired for the optical fiber clamp 28 for its use as an external heat sink. The passageways should not be so large or numerous that they would compromise the function of the optical fiber clamp 28 of holding bundled ends 22 in their tightly gathered configuration.

In a further embodiment (also not shown), the optical fiber clamp 28 has at least one passage for fluid within the fiber clamp 28, but the proximal side of the optical fiber clamp 28 which is adjacent to the conduit 48 is continuous, i.e., it has no passages for fluid to flow out of the clamp 28 to conduit 46. Here, the optical fiber clamp 28 is useful as a heat sink and yet all fluid must flow through the interstitial channels 26 to exit the chamber 12.

The fluid used to absorb and transfer the heat from the bundle interface 24 can be a liquid or a gas. A liquid coolant is generally preferred, since liquids typically have a higher cooling efficiency. The liquid coolant in accordance with the present invention can be any inert fluid with a sufficiently low melting point so that the liquid freely flows at the desired low temperature to optimize heat exchange. Ethylene glycol is preferably used. Ethylene glycol is generally used at about room temperature, from about 20° C. to about 35° C. At lower temperatures, ethylene glycol can be viscous. Water can be used, although it may be absorbed to some extent by plastic fibers. Water may be used at lower temperatures than ethylene glycol. The use of liquid nitrogen for cooling very high heat loads is not out of the realm of the present invention. Within the constraints of the particular coolant used, any cooling temperature can be employed which is well below the softening temperature of the optical fibers 14.

Using ethylene glycol at 25° C. can typically achieve a fiber temperature of about 29° C. or 30° C. It will be understood that the ΔT is taken consideration in choosing a coolant temperature for any desired fiber temperature.

A cooling gas which can preferably be used is cooled air. Nitrogen or other suitable insert gas can be used. Preferably, the gas can be kept under pressure and at low temperature.

Windowed wall 46 is preferably present in front of the face of the bundle interface 24 to contain the fluid as it exits the interstitial channels 26. Because of the presence of the windowed wall 46 as well as the outlet 44 which is operatively connected to a pump which moves fluid out the chamber 12, the fluid entering the conduit 48 changes direction. The fluid in the conduit 48 flows upward toward the outlet 44. The flow of fluid past the individual proximal ends 16 aids in transferring heat from the face of the bundle interface 24.

When the fluid used is a liquid, the windowed wall 46 or other means of containing and/or routing the liquid to outlet 44 is present. It is also preferable to provide the windowed wall 46 when a gas coolant is used. The barrier forces the gas through the conduit 48 over the face of the bundle interface 24. Having the gas (or liquid) flow inline with a pump permits higher flow rates and more efficient heat exchange.

In an other embodiment with regard to the face of the bundle interface 24, the proximal ends 16 are convex. The convex shape assists the fluid exiting from the interstitial channels 26 in removing heat at the proximal ends 16.

The window of windowed wall 46 can have a coating or integral substance that acts as a radiation filter which allows only visible light to pass through, and blocks undesirable wavelengths such as near infrared (NIR) or ultraviolet (UV) wavelengths.

Preferably, the fluid flows from the gap through the interstitial channels 26 and lastly, over the face of the bundle interface 24 through the conduit 48, to absorb the greatest amount of heat at the end of its passage through the chamber 12. The fluid then transfers the heat to a refrigeration unit or remote location where it can be dissipated. The flow of fluid can be reversed if desired.

Figure 4:
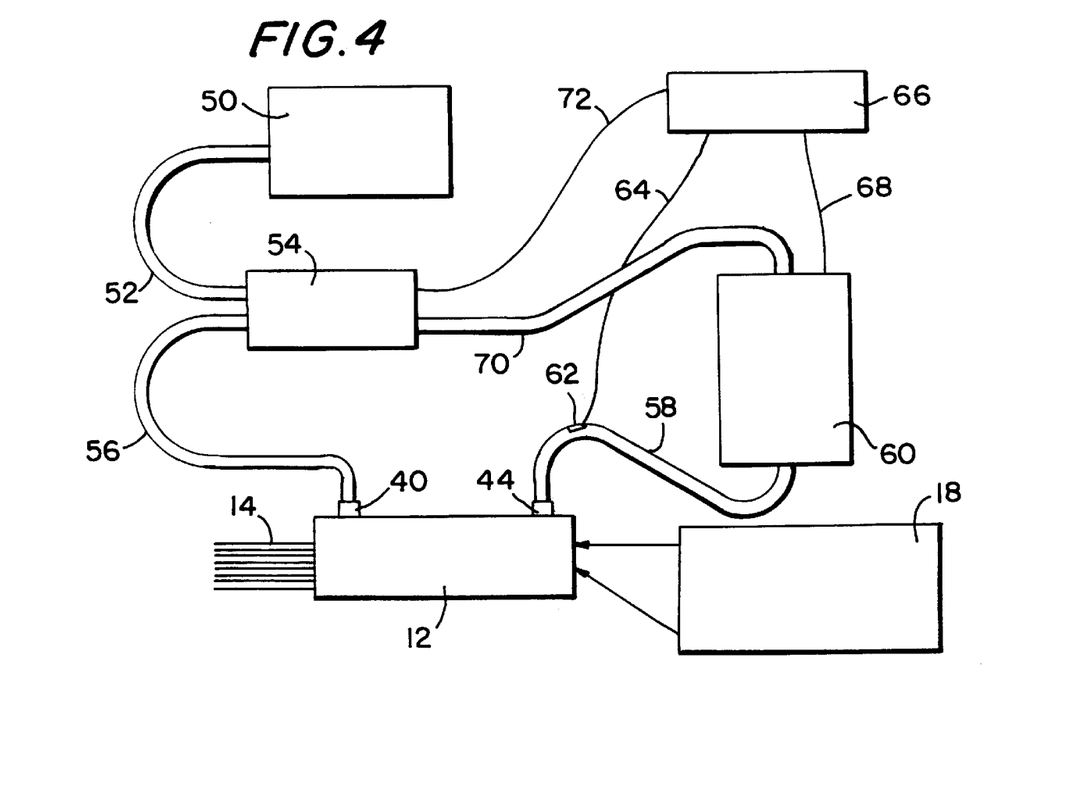
FIG. 4 is a schematic diagram illustrating fluid flow external to the chamber in accordance with a preferred embodiment of the present invention.

A schematic diagram illustrating a preferred fluid flow external to the chamber in accordance with the present invention is provided in FIG. 4. The chamber 12 has the inlet 40 and the outlet 44 as in FIG. 1. Fluid is stored in the reservoir 50 which maintains the fluid at the desired cooling temperature. Depending upon the fluid used, reservoir 50 can be capable of refrigeration. Fluid is brought from the reservoir 50 through the tubing 52 by the action of the pressurized pump 54, and further moved through the tubing 56 which is operatively connected to the inlet 40, to be delivered to the chamber 12. The continual action of the pump 54 causes the fluid to circulate within the chamber 12, and travel through the interstitial channels 26 and the conduit 48 as discussed above. The fluid then exits the outlet 44 and travels through the tubing 58 which is connected to the outlet 44, to the heat exchanger 60. The heat exchanger 60 can be a refrigeration unit or heat sink. The fluid circulates within the heat exchanger 60 to cool the fluid as desired.

As shown within the tubing 58 upstream of the heat exchanger 60, a temperature sensor 62 may be present in-line to detect the temperature of fluid from the chamber 12. The detection signal of the temperature sensor 62 is communicated by the communication means 64 to the control unit 66. Based upon the temperature signal from the temperature sensor 62, the control unit 66 can send a signal via the communication means 68 to the heat exchanger 60 to, if necessary, change the temperature within the heat exchanger 60 or alter the time in which the fluid remains within. Also, the heat exchanger 60 may have a heat sensor (not shown) within.

Fluid which is cooled as desired travels from the heat exchanger 60 through tubing 70 to the pump 54. Pump 54 is preferably controlled by a signal from the control unit 66 which travels through communication means 72. Preferably, the control unit 66 sends a signal to the pump 54 to regulate flow rate. Flow rate can otherwise advantageously be regulated directly at the pump 54. When fluid recycled from the heat exchanger 60 enters the pump 54, the fluid can be moved to the chamber 12, rather than accessing further fluid from the reservoir 50.

The interstitial fiber optic cooling system of the present invention is an efficient system for removing heat generated by a high intensity light source in a fiber optic bundle interface. The system forces a heat transfer fluid, which can be either a liquid or gas, to flow through the interstitial channels between hexagonal close packed fibers. By flowing a fluid through the interior of the bundle, the heat transfer process is extremely efficient.

Light source 18 can be any source suitable for providing light for transmission by fiber optics. It will be understood that light source 18 can be a collector or reflector of a light generating source, or a light generating source directly. Advantageously, light source 18 is a high intensity light source which generates large amounts of heat in the bundle interface 24. A very large or concentrated light source such as a solar collection source can be used simply and reliably, without great expense. A Fresnel lens, for example, can be used. Other examples of light sources include a high intensity discharge lamp (HID) mounted in concentrators which maximize transfer of light from the lamp element to the fiber bundle, and a solar energy parabolic concentrator. In view of the optimal cooling provided, the light emitter of the light source 18 need not be lined up exactly with the windowed wall 46.

The cooling efficiency of the system of the present invention is orders of magnitude higher than for prior designs used in connection with the transfer of solar light energy. The cooling fluid advantageously comes into direct contact with individual fibers. Experimental and thermal transfer modeling have shown that the high efficiency of the cooling allows nominal flow rates (about 0.5 gal/min) and fluid pressures (about 5 PSI) to be useful in removing approximately 300 watts of heat from an approximately 1.5 inch diameter bundle. Lower flow rates and pressures can be used if desired, e.g., from at least about 0.08 gal/min and from at least about 2.5 PSI.

The system of the present invention is capable of removing increasingly greater amounts of heat from a bundle interface during light transfer by increasing the flow rate of fluid through the interstitial channels. High flow rates remove heat more rapidly. High flow rates are preferably used with an increase in the pressure of the fluid at the inlet port. A pressure of 50 PSI can be employed, for example, using PVC plastic material for the chamber 12.

The construction of the system allows extremely high pressures to be used, if desired. The pressures which may be used depend upon the strength of the chamber 12 material, the durability of the sealant and the capacity of the pump 54. Pressures of 100 PSI or more can be used. With a stainless steel chamber, very high pressures can be achieved, e.g., up to 1000 PSI. Flow rates also can be very high, e.g., about 10 gal/min. Flow rate is preferably not so great that it would abrade the fibers. High intensity light sources are advantageously used when the chamber 12 is pressurized, and a cooling fluid is pumped through at a high flow rate.

The system advantageously permits the use of a large sized FO bundle. For example, for a bundle which is approximately 1.5 in. in diameter, 300 to 500 Watts of waste heat can be removed using the parameters of about a 0.08 gal/min flow rate and a head pressure of about 10 PSI. Bundles of both large and small diameter are cooled with equal efficiency.

When a liquid is used as the coolant there is only a single interface which has an appreciable mismatch of refractive index. This is at the window of the windowed wall 46 (air to glass). For the light traveling between the liquid and an optical fiber, the refractive index mismatch is small. This limits optical losses due to Fresnel reflections. Moreover, heat transfer from the bundle interface to a liquid coolant is high.

When a gas coolant is used, the flow rate can be higher than that for a liquid in order to achieve the same cooling effect. For the flow rate of a gas to achieve about the same cooling efficiency as for a liquid, the gas will require roughly 10 times the flow rate as for a typical liquid. The flow rate for a gas can be, for example, up to about 100 gal/min across the fiber face.

Advantageously, the apparatus of the present invention is simply designed and readily adaptable to existing FO bundles and light sources.

While the invention has been described and illustrated with respect to illustrative embodiments and modes of practice, it will be apparent to those skilled in the art that various modifications and improvements may be made without departing from the scope of the present invention.

What is claimed is:

1. A fiber optic bundle interface cooling system for cooling a fiber optic bundle interface which receives light from a light source, comprising:
    (a) a chamber having a windowed wall, said windowed wall comprising a window having light pass through;
    (b) a bundle of optical fibers which is at least in part enclosed in the chamber, said bundle having optical fiber ends gathered such that interstitial spaces are present between the gathered optical fiber ends to provide the fiber optic bundle interface, said bundle interface being disposed within the chamber such that the windowed wall is spaced from the bundle interface to provide a conduit for fluid flow between the bundle interface and the windowed wall;
    (c) a separation plate, said separation plate being spaced apart from the bundle interface and having a plurality of apertures, each of said apertures having an optical fiber of the bundle extending therethrough, the separation plate holding each optical fiber separate from each other to provide a gap, each said optical fiber being sealed to the separation plate;
    (d) an inlet for providing a cooling fluid to the chamber;
    (e) a pump operatively connected to the chamber for moving the cooling fluid through the interstitial spaces and through the conduit for the transfer of heat from the optical fibers to the cooling fluid; and
    (f) an outlet for removing the fluid from the chamber.

2. The system according to claim 1, wherein the chamber is enclosed.

3. The system according to claim 2, wherein the system is being pressurized.

4. The system according to claim 1, wherein the inlet is disposed in the proximity of the separation plate.

5. The system according to claim 1, wherein the outlet is disposed inline with the conduit.

6. The system according to claim 1, wherein the bundle interface is in a hexagonal close packed configuration.

7. The system according to claim 1, wherein the apertures of the separation plate are evenly spaced apart.

8. The system according to claim 7, wherein the apertures are in a staggered array.

9. The system according to claim 1, wherein the optical fibers are plastic.

10. The system according to claim 1, wherein the optical fibers are taken from the group consisting of glass and quartz.

11. The system according to claim 10, wherein at least some of the optical fibers are bent distal to the bundle interface, such that the optical fibers in the chamber have a separated fiber portion.

12. The system according to claim 1, wherein proximal ends of the bundle interface are flat.

13. The system according to claim 1, wherein proximal ends of the bundle interface are convex.

14. The system of claim 1, wherein the window comprises a filter which prevents light rays in the near infrared and ultraviolet wavelengths from passing through.

15. The system according to claim 1, wherein the pump moves the fluid at a high flow rate.

16. The system according to claim 1, wherein the pump regulates the flow rate of the liquid.

17. The system according to claim 1, wherein the chamber is made of a material taken from the group consisting of aluminum, stainless steel and plastic.

18. The system according to claim 1, further comprising a fluid for passing through the interstitial spaces and the conduit to cool the bundle interface.

19. The system according to claim 18, wherein the fluid is a liquid.

20. The system according to claim 19, wherein the liquid is ethylene glycol.

21. The system according to claim 18, wherein the fluid is an inert gas.

22. The system according to claim 21, wherein the gas is air.

23. The system according to claim 21, wherein the gas is nitrogen.

24. The system according to claim 1, further comprising an optical fiber clamp which holds the optical fiber ends in their gathered configuration as the optical fiber bundle interface.

25. The system according to claim 24, wherein the optical fiber clamp is solid.

26. The system according to claim 24, wherein the optical fiber clamp has at least one passageway for fluid to flow through to the conduit.

27. The system according to claim 24, wherein the optical fiber clamp has at least one passage for fluid within said fiber clamp.

28. The system according to claim 1, further comprising a heat exchanger for cooling the fluid circulated through the chamber such that the fluid is capable of being recirculated to the chamber as cooling fluid.

29. The system according to claim 28, further comprising a temperature sensor upstream of the heat exchanger.

30. The system according to claim 1, further comprising a control unit to regulate the flow of the fluid.

31. The system according to claim 1 further comprising a high intensity light source disposed for delivering high intensity light to the fiber optic bundle interface; whereby a fiber optic system for channeling high intensity light is provided.

32. The system according to claim 31 wherein the light source is a solar collector.

33. A fiber optic bundle interface cooling system for cooling a fiber optic bundle interface which receives light from a light source, comprising:

(a) a chamber having a windowed wall, said windowed wall comprising a window capable of having light pass through;

(b) a bundle of optical fibers which are at least in part enclosed in the chamber, said bundle having optical fiber ends gathered such that interstitial spaces are present between the gathered optical fiber ends to provide the fiber optic bundle interface, said bundle interface being disposed within the chamber in proximity to the window such that it receives light which passes therethrough;

(c) a separation plate, said separation plate being spaced apart from the bundle interface and having a plurality of apertures, each of said apertures having an optical fiber of the bundle extending therethrough, the separation plate holding each optical fiber separate from each other to provide a gap, each said optical fiber being sealed to the separation plate;

(d) an inlet for providing a cooling fluid to the chamber;

(e) a pressurized pump operatively connected to the chamber which moves the cooling fluid through the interstitial spaces; and (f) an outlet for removing the fluid from the chamber.

34. An apparatus for cooling interface of a fiber optic bundle which receives light from a light source, comprising:

(a) a chamber which comprises
 (i) an inlet;
 (ii) a separation plate having a plurality of apertures, each of which holds an optical fiber of the fiber optic bundle therethrough, said separation plate comprising a wall of the chamber;
 (iii) a windowed wall opposite the separation plate, comprising a window having light pass therethrough; and
 (iv) an outlet;

(b) an optical fiber clamp within the chamber for holding optical fiber ends of the fiber optic bundle in a gathered configuration to provide the interface of the optic bundle, said optical fiber clamp being in proximity to the windowed wall;

(c) a pump operatively connected to the inlet and the outlet of the chamber; and (d) a reservoir for holding a cooling fluid.

35. The apparatus according to claim 34, wherein the chamber is made of a material taken from the group consisting of aluminum, stainless steel and plastic.

36. The apparatus according to claim 34, wherein the optical fiber clamp is brass.

37. The apparatus according to claim 34, wherein the apertures of the separation plate are evenly spaced apart.

38. The apparatus according to claim 34, wherein the window comprises a filter which prevents light rays in the near infrared and ultraviolet wavelengths from passing through.

39. The apparatus according to claim 34, wherein the pump is capable of moving the fluid at a high flow rate.

40. The apparatus according to claim 34, wherein the pump pressurizes the chamber when optical fibers within the apertures of the separation plate are sealed to the separation plate.

41. The apparatus of claim 33 further comprising a heat exchanger operatively connected to the outlet and the pump.

42. A method for cooling a fiber optic bundle interface having optical fiber ends of a bundle of optical fibers which are gathered such that interstitial spaces are present, said bundle interface receives light from a light source, comprising the following steps in sequence:

(a) moving a fluid with a pump into a chamber having the bundle interface and a separated fiber portion of the optical fibers which define a gap, such that the fluid enters the gap;

(b) moving the fluid from the gap with the pump through the interstitial channels; and (c) moving the fluid from the interstitial channels with the pump out of the chamber.

43. The method according to claim 42, wherein the pump moves the fluid at a flow rate of from about 0.08 gal/min to about 100 gal/min.

44. The method according to claim 43, wherein the flow rate is about 0.5 gal/min.

45. The method according to claim 43, wherein the pump moves the fluid at a flow rate of about 10 gal/min.

46. The method according to claim 42, wherein the fluid is moved under a pressure of from about 2.5 PSI to about 1000 PSI.

47. The method according to claim 46, wherein the pressure is from about 5 PSI to about 100 PSI.

48. The method according to claim 47, wherein the pressure is about 50 PSI.

49. The method in accordance with claim 42, further comprising after step (b) and before step (c), moving the fluid through a conduit between the bundle interface and the windowed wall.

* * * * *

UNITED STATES PATENT AND TRADEMARK OFFICE
CERTIFICATE OF CORRECTION

PATENT NO. : 6,078,714
DATED : June 20, 2000
INVENTOR(S) : David Barr Cavanaughi It is certified that error appears in the above-identified patent and that said Letters Patent is hereby corrected as shown below:

Claim 33, column 11,
Line 40, delete " capable of";

Claim 39, column 12,
Line 28, delete "is capable of moving" and insert therefor -- moves --.

Signed and Sealed this

Second Day of October, 2001

Attest:

*Nicholas P. Godici*

NICHOLAS P. GODICI
*Acting Director of the United States Patent and Trademark Office*

*Attesting Officer*

UNITED STATES PATENT AND TRADEMARK OFFICE
CERTIFICATE OF CORRECTION

| | |
|---|---|
| PATENT NO. | : 6,078,714 |
| DATED | : June 20, 2000 |
| INVENTOR(S) | : David Barr Cavanaugh |

Page 1 of 1

It is certified that error appears in the above-identified patent and that said Letters Patent is hereby corrected as shown below:

Column 11, claim 33,
Line 40, delete "capable of";

Column 12, claim 39,
Line 28, delete "is capable of moving" and insert therefor -- moves --.

Signed and Sealed this

Sixteenth Day of October, 2001

Attest:

*Nicholas P. Godici*

NICHOLAS P. GODICI
*Attesting Officer    Acting Director of the United States Patent and Trademark Office*